United States Patent

[11] 3,583,400

| [72] | Inventors | Charles R. Memhardt<br>Morton Grove;<br>Stanley J. Sedivy, Chicago Ridge, both of, Ill. |
|---|---|---|
| [21] | Appl. No. | 791,047 |
| [22] | Filed | Jan. 14, 1969 |
| [45] | Patented | June 8, 1971 |
| [73] | Assignee | Baxter Laboratories, Inc.<br>Morton Grove, Ill. |

[54] FLUID COLLECTING APPARATUS AND PROCESS
18 Claims, 3 Drawing Figs.

[52] U.S. Cl. .................................................... 128/275,
128/Blood Digest, 141/74, 141/192

[51] Int. Cl. ........................................................ A61f 5/44
[50] Field of Search ............................................ 141/74, 72,
73, 192; 128/1, 275—278

[56] References Cited
UNITED STATES PATENTS

| 2,845,929 | 8/1958 | Strumia ........................ | 128/276 |
| 2,982,286 | 5/1961 | Welch, Jr. ..................... | 128/276 |
| 3,032,037 | 5/1962 | Huber .......................... | 128/276 |

*Primary Examiner*—Charles F. Rosenbaum
*Attorneys*—Walter C. Kehm and Sherman P. Appel ABSTRACT: A switch controls flow of a fluid to a collection station in response to momentum of collected fluid at the station.

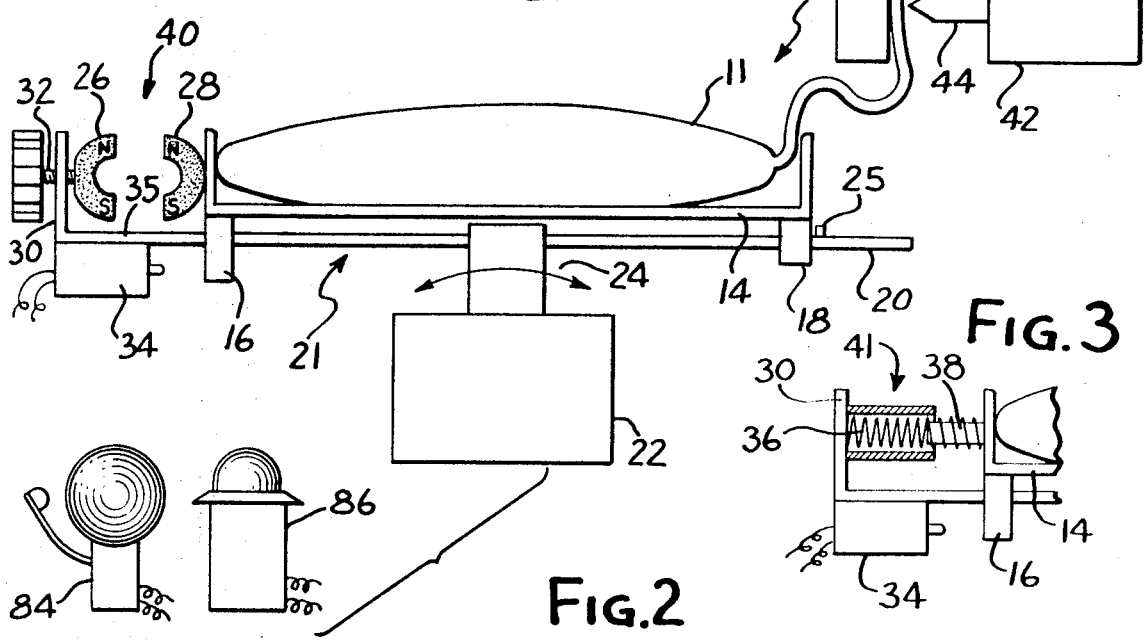
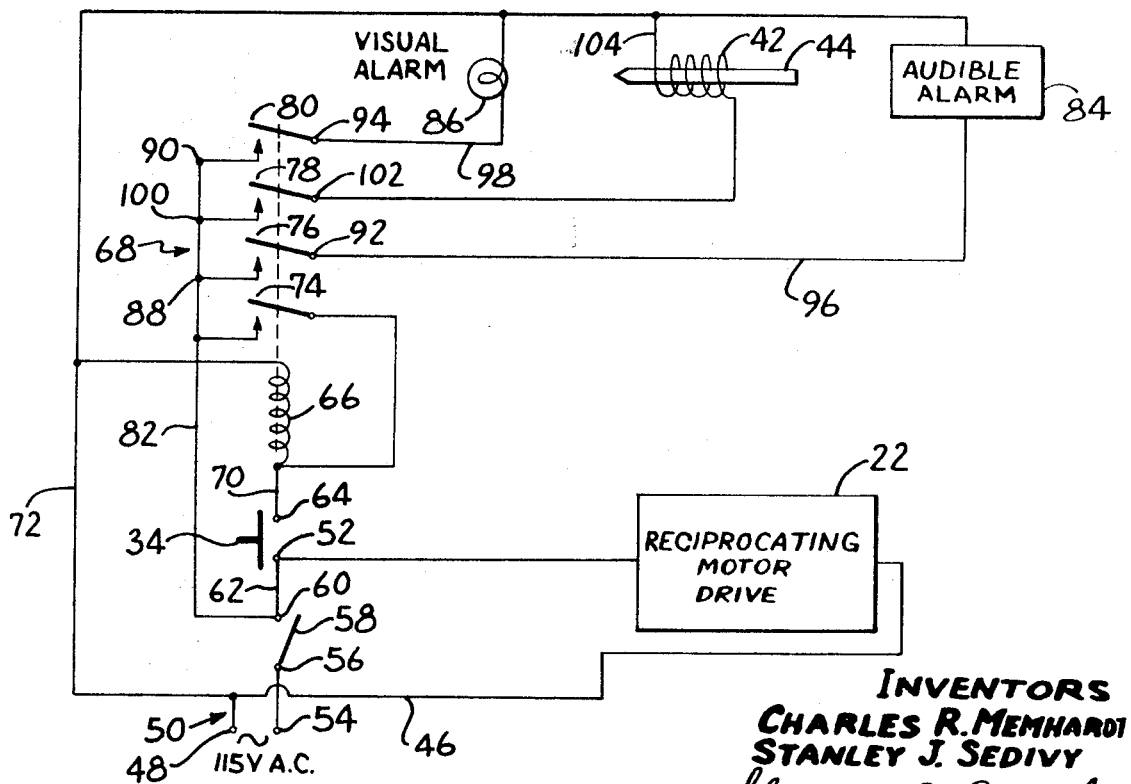

FLUID COLLECTING APPARATUS AND PROCESS

The present invention relates to collection of liquids in moving containers. Particularly it relates to control of volume of liquid collecting in a moving container. Specifically it relates to effecting such control from the liquid collecting end of a flow path.

Prior to the invention there has been no economically practical means or process for highly accurate volumetric determination at the collection end of a flow path for liquid being collected in a moving container. Such measurement may be desirable in a process for collecting liquids in batches to effect timely and accurate flow cutoff during liquid transfer, especially when flow measurement is impractical upstream of a collection station.

Heretofore known techniques to determine volume, by weighing liquid during collection in a moving container, have not been highly accurate. Moreover, known procedures for measuring volume of a moving liquid produce results which are acceptable only if tolerances are great.

Particularly, the problem is significant, for example, in connection with collecting whole blood. According to present practice a living donor is bled into a collapsible plastic bag having a standard capacity with a view to procuring a unit (standard) volume. The bag is shaken during blood collection to agitate the collecting blood and mix it with an anticoagulant to prevent clotting.

Conventionally, shutting off flow of blood from a donor into a bag is controlled through the agency of electric means which is responsive to a sensor. The latter is arranged in a fixed position for sensing the bag when suitably distended by collected liquid. This apparatus, although not highly efficient, because of changing bag geometry which occurs during filling, has enjoyed great popularity because of the lack of more accurate volume measuring means.

It is an object of the present invention to provide improved flow control apparatus.

It is another object of the invention to measure liquid collecting in a moving container at the collection station.

It is a further object of the invention to control bleeding of a donor accurately to provide a predetermined volume of blood.

An additional object of the invention is to terminate liquid flow between a source and a moving container when a predetermined mass of the liquid has been collected in the container.

To effect the foregoing objectives, flow control apparatus has a fluid collection station. Means are provided for delivering fluid to said station, and means are provided for moving the fluid delivered to said station while at said station. Means are arranged for responding to the momentum generated by the moving collected fluid to determine the volume of fluid delivered.

How further to effect the foregoing and other objects of the invention, will become apparent from the following description and appended claims having reference to the accompanying drawings wherein like numerals refer to like parts throughout the several views on which:

FIG. 1. is a schematic of apparatus embodying the present invention;

FIG. 2. is an exemplary wiring scheme for the apparatus shown in FIG. 1. and

FIG. 3 is a side elevational view of modified responding means for said apparatus.

Referring now more particularly to FIG. 1., exemplary fluid collecting apparatus 10 comprises a container 11 having an inlet 12 fashioned as a tube for providing fluid communication between said container and a source (not shown). Container 11 may be a flexible or collapsible bag, fabricated from a plastic such as polyethylene or polyvinyl of adequate guage to enable storage of a fluid, such as blood from a donor, for example, following collection.

Means for supporting container 11 while it is filling through inlet 12 comprises a holder or tray 14 which is shiftably mounted and thereby adapted to move and agitate fluid contents of the container. A plurality of blocks 16 and 18 are rigidly secured to, and depend from, opposite ends of the lower part of holder 14. They are internally conditioned as bearings for slideably coupling said holder to an elongated slide or rod 20 of a frame 21 for the apparatus.

A reciprocative motor drive 22, which may be of any conventional or obvious construction, is arranged for rocking or reciprocating slide 20 in alternating directions designated by arrow 24, preferably at a constant speed, for shifting holder 14 longitudinally of the slide as the latter is rocked. A stop 25, secured to frame 21, prevents holder 14 from separating from slide 20 when it is in a clockwise phase of alternation. Thereby, said drive comprises means for moving said container while supported and is adapted to generate an alternating momentum which increases according to liquid mass in said container.

Means generally designated 40 for responding to the momentum generated while container 11 is filling includes at least one member productive of a yieldable force.

According to one aspect of the invention, a permanent magnet couplet of a pair of permanent magnets 26 and 28 is adapted for producing the yieldable force. The magnets are arranged for repelling one another, their size and spacing being such that the repelling force will yield to a momentum of a magnitude corresponding to a liquid mass in the container of selected level magnitude. That is to say, magnets 26 and 28 have a first condition in which the repelling force of the magnetic field has yielded under a momentum beyond a selected level and a second condition to which said magnets are normally biased while said repelling force holds the magnets apart because of momentum below said level.

In the illustrated embodiment, magnet 28 of the couplet is rigidly secured to holder 14 and accordingly constrained for movement therewith. Magnet 26 is mounted in an adjustably fixed position to adjust the force of the repelling magnetic field between magnets 26 and 28. Securance of magnet 26 is through the agency of a screw 32 on the inner end portion of which the last magnet is fast and which is adjustably threaded through a fixed upward extension 30 of frame 21.

An electrical switch 34 which is biased open is mounted from frame portion 35 in alignment with block 16. The latter is arranged and proportioned as a striker for moving or actuating the switch to a circuit closed condition when the magnetic field of the magnet couplet yields, that is, when said magnets have moved to said first condition from said second condition. The arrangement of parts is such that while the magnets are in their second condition, the striker is spaced from said switch 34.

Modified responding means, generally designated 41, comprehends a compression spring 36 fashioned to yield upon application thereto of a force beyond said selected level. The spring may be carried from extension 30 in lieu of magnet 26. A compressor 38 is secured on an end of holder 14 in lieu of magnet 28 and in alignment for engagement with the spring. The modified responding means has a normal condition to which the parts are spring biased. However, the spring is fashioned for compression to a yielded condition when the momentum generated and impinged thereupon by compressor 38 rises above said selected level. Upon such occurrence, holder 14 and the striker carried therewith will be released to actuate switch 34.

Means for blocking flow through inlet 12 when the responding means is in its yielded condition comprises a suitably and fixedly mounted solenoid 42 which is operatively connected to switch 34, said solenoid being arranged with its armature 44 adjacent and aligned with a stationary block 43 to form a clamping assembly. In a manner which will be evident from ensuing description, when switch 34 is actuated, solenoid armature 44 will be projected to impinge the tube comprising inlet 12 against block 43 for cutting off flow.

Exemplary circuit (FIG. 2.) for the apparatus comprises a conductor 46 which at one end is connected to one terminal 48 of a voltage source 50. At its other end, conductor 46 is operably connected to one side of drive 22, the other side of said drive being connected to a terminal 52 of switch 34. The other terminal 54 of source 50 is connected to one terminal 56 of a single pole single throw switch 58 whose opposite terminal 60 is connected to the terminal 52 through a circuit wire 62. By reason of the foregoing, while switch 58 is closed against terminal 60, the reciprocative drive will be actuated and remain in such condition until the switch is intentionally opened.

A conductor 70 extending from terminal 64 of switch 34 is connected to one side of an inductance 66 for actuating or closing the normally open switches 74, 76, 78 and 80 of a stacked relay 68 with which said inductance is magnetically coupled, one switch 34 is closed. The opposite side of said inductance is connected to terminal 48 through a circuit wire 72.

Switch 74 controls a bypass circuit 75 about switch 34 and between terminal 60 and inductance 66 through a conductor 82. This arrangement insures that inductance 66, once energized, will remain in such state even though switch 34 is opened (provided that switch 58 remains closed) during normal alternation of drive 22.

While the inductance is energized, a pair of continuous audible and visual alarms 84 and 86, either of which may be omitted, and which are respectively controlled by switches 76 and 80, will be energized. To that end the terminals 88 and 90 of said last switches are connected to terminal 60 through conductor 82; and terminals 92 and 94 of said last switches are connected through a pair of conductors 96 and 98, respectively to one side of their respective alarms. To complete the alarm circuits, the other sides of said alarms are connected to terminal 48 through circuit wire 72.

A terminal 100 of switch 78 is connected to terminal 60 through conductor 82. The other terminal 102 of said last switch is connected to one side of the inductance coil of solenoid 42, the opposite side of said coil being connected to terminal 48 of the source through its connection to circuit wire 72 by circuit element 104. Therefore, when the striker closes switch 34 the armature 44 will be actuated to a permanent clamping condition and stop flow through inlet 12, as long as switch 58 remains closed.

By reason of the invention accurate volumetric control of moving fluid can be readily attained from a collection station while fluid is being collected and the collection container is being moved. This is especially important in procurance of whole blood to prevent excessive bleeding of donors and insure procurance of standard size blood units at low cost. Heretofore known apparatus providing optimal accuracy require disposition upstream in a flow path and are therefore prohibitively expensive.

As many substitutions and changes could be made in the above described construction and process, and as many apparently widely different embodiments could be conceived without departing from the scope and spirit of the invention, it is intended that all matter contained in the accompanying specification shall be interpreted as being illustrative and not in a limiting sense.

What I claim is:

1. Flow control apparatus comprising:
a fluid collection station;
means for delivering fluid to said station;
means for moving the fluid delivered to said station while at said station, and
means for responding to the momentum of the moving collected fluid to determine the volume of fluid delivered.

2. Apparatus according to claim 1 in which the moving means comprises a reciprocative drive for alternating collected fluid at a constant rate.

3. Apparatus according to claim 1 in which the responding means is biased to a normal condition and arranged for movement to a yielded condition and in response to momentum of selected magnitude.

4. Apparatus according to claim 3 in which the responding means is a magnetic field providing a repelling magnetic force for maintaining said normal condition and yieldable to said yielded condition in response to momentum of said selected magnitude.

5. Apparatus according to claim 3 in which said responding means is a spring.

6. Apparatus according to claim 3 further characterized by:
a clamp for controlling flow through said delivery means and
an electrical circuit for moving said clamp in response to the condition of said responding means.

7. Blood collecting apparatus comprising: a flexible container with an anticoagulant and having a blood inlet; means for supporting said container as it is filling with blood through said inlet; means for moving said container while supported; means for selectively blocking flow through said inlet; second means controlling said flow blocking means arranged for responding to the momentum generated by the mass in the container while filling and having a first condition in which flow through said inlet is blocked when momentum beyond a selected level is reached and a second condition in which flow is maintained through said inlet until said momentum reaches said level.

8. Apparatus according to claim 7 in which the supporting means comprises a shiftable holder for agitating the mass in said container.

9. Apparatus according to claim 8 further characterized in that said supporting means includes a slide on which said holder is reciprocatively mounted, said moving means arranged for rocking said slide.

10. Apparatus according to claim 7 in which said responding means includes a member for developing a yieldable force and normally biased to said second condition.

11. Apparatus according to claim 10 in which said supporting means is a holder for said container arranged for reciprocation by said moving means, said apparatus further characterized by:
a striker connected to said holder, and
a switch connected to said flow blocking means and arranged for actuation by said striker as said yieldable member moves from its second to its first condition.

12. Apparatus according to claim 10 in which the member is a first magnet and characterized by a second magnet arranged for repelling said first magnet with a force which yields upon generation of momentum beyond said selected level.

13. Apparatus according to claim 10 in which said member is a spring fashioned to yield upon generation of momentum beyond said level and further characterized by a spring engaging member arranged for reciprocation by said moving means.

14. Apparatus according to claim 12 in which said supporting means is a holder for said container arranged for reciprocation by said moving means and characterized in that one of said magnets is mounted in a fixed position relative the one magnet.

15. Apparatus according to claim 7 in which the flow blocking means comprises:
a solenoid,
a clamp operatively associated with said solenoid and arranged for enabling and cutting off flow in said inlet,
circuitry for said solenoid, and
a switch in said circuit for completing and opening a circuit to said solenoid according to the level of the momentum of blood in said container while moving.

16. Apparatus according to claim 7 characterized by circuitry for said blocking means, and a signalling member in said circuit and having an active condition when said responding means is in said first condition.

17. In a process for collecting blood from a donor in a container which is being moved to agitate the contents, the steps of:
impinging the momentum of the moving mass upon a force adapted to yield to a momentum of selected magnitude and actuating flow interrupting means when said force yields to stop blood flow to said container.

18. A combination according to claim 17 characterized in that the moving mass is alternated to alternatively impinge and release its momentum on the yieldable force, and the flow stopped condition is maintained during alternation of momentum after such condition is attained.